US008887226B2

(12) United States Patent
Kimura et al.

(10) Patent No.: US 8,887,226 B2
(45) Date of Patent: Nov. 11, 2014

(54) INFORMATION PROCESSING APPARATUS, METHOD FOR CONTROLLING INFORMATION PROCESSING APPARATUS, AND RECORDING MEDIUM STORING PROGRAM FOR CONTROLLING INFORMATION PROCESSING APPARATUS

(75) Inventors: Masatoshi Kimura, Kawasaki (JP); Tetsukazu Mochizuki, Kawasaki (JP); Rieko Utsumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 13/150,382

(22) Filed: Jun. 1, 2011

(65) Prior Publication Data
US 2011/0317070 A1 Dec. 29, 2011

(30) Foreign Application Priority Data
Jun. 28, 2010 (JP) .................. 2010-146693

(51) Int. Cl.
*H04N 7/173* (2011.01)
*H04N 21/4363* (2011.01)
*H04N 21/41* (2011.01)
*G06F 3/14* (2006.01)
*H04N 21/422* (2011.01)
*G09G 5/00* (2006.01)

(52) U.S. Cl.
CPC ......... *H04N 21/43632* (2013.01); *G09G 5/006* (2013.01); *G09G 2370/06* (2013.01); *H04N 21/4126* (2013.01); *G09G 2370/20* (2013.01); *G09G 2370/12* (2013.01); *G09G 2370/16* (2013.01); *G09G 2330/021* (2013.01); *G06F 3/1423* (2013.01); *H04N 21/422* (2013.01)
USPC ............................ 725/133; 725/141; 725/153

(58) Field of Classification Search
CPC .................................................. H04N 7/17318
USPC .......................................... 725/133, 141, 153
See application file for complete search history.

(56) References Cited

U.S. PATENT DOCUMENTS

| 6,219,839 | B1 * | 4/2001 | Sampsell .................. 725/40 |
| 6,567,984 | B1 * | 5/2003 | Allport .................. 725/110 |
| 2009/0276813 | A1 * | 11/2009 | Bleiweiss et al. ............... 725/82 |
| 2010/0033026 | A1 | 2/2010 | Goto et al. |

FOREIGN PATENT DOCUMENTS

| JP | 1992-15688 A | 1/1992 |
| JP | 2002-175173 A | 6/2002 |
| JP | 2004-40656 A | 2/2004 |
| JP | 2004-96361 A | 3/2004 |
| JP | 2010-45450 A | 2/2010 |

OTHER PUBLICATIONS

Chinese Office Action mailed Jun. 8, 2013 for corresponding Chinese Application No. 201110176500.7, with English-language Translation.

* cited by examiner

*Primary Examiner* — Hunter B Lonsberry
(74) *Attorney, Agent, or Firm* — Fujitsu Patent Center

(57) ABSTRACT

An information processing apparatus includes a video signal output unit to output different video signals to a first display unit and a second display unit, a screen switching input unit to input an instruction for switching between a screen displayed on the first display unit and a screen displayed on the second display unit, a determining unit to determine whether an input source of the input path selected for the first display unit is the video signal output unit, and an input control unit turning on the first display unit when the first display unit is turned off at the time of reception of the switching instruction, the input control unit switching the input source to the video signal output unit when the determining unit determines that the input source is not the video signal output unit.

16 Claims, 7 Drawing Sheets

INFORMATION PROCESSING APPARATUS, METHOD FOR CONTROLLING INFORMATION PROCESSING APPARATUS, AND RECORDING MEDIUM STORING PROGRAM FOR CONTROLLING INFORMATION PROCESSING APPARATUS

CROSS-REFERENCE TO RELATED APPLICATIONS

This application is based upon and claims the benefit of priority of the prior Japanese Patent Application No. 2010-146693, filed on Jun. 28, 2010, the entire contents of which are incorporated herein by reference.

FIELD

The present invention relates to an information processing apparatus, a method for controlling the information processing apparatus, and a recording medium storing a program for controlling the information processing apparatus.

BACKGROUND

Recently, the number of media distributing various movies, such as a movie sites on the Internet, has been increasing. Additionally, there is an increasing demand for viewing movies downloaded in personal computers (PCs) from such media with large screens of televisions (TVs). Thus, opportunities for displaying operation screens of the PCs on TVs having large display screens are also increasing.

Additionally, the use of a multi-display environment has been increasing recently in which a plurality of displays connected to a personal computer (PC) is used to extend a display area.

When users want to view videos, such as programs sent from broadcasting stations, these videos are displayed on the TVs that may be utilized as the operation screens of the PCs. Since the TVs are not utilized as the operation screens of the PCs in such a case, the operation screens of the PCs have to be displayed on an auxiliary screen, such as a small monitor, to operate the PCs. Additionally, when users retrieve a movie and then show the movie to their family, the retrieval operation is not necessarily shown to all of the family. Thus, the users perform the retrieval with the auxiliary screen and then display only the movie on the TVs after finding an intended movie. When the PCs are connected to the TVs and the TVs are set to display the operation screens of the PCs thereon, the TVs connected to the PCs and the auxiliary screen are often switched between for use. That is, a multi-display environment constituted by the TV and the auxiliary screen is used. Hereinafter, a screen used as a main screen for performing operations of the PCs is referred to as a primary display, whereas a screen used as a sub screen for performing the operations of the PCs is referred to as a secondary display.

Hitherto, a technique is provided that switches between a TV screen and a PC screen displayed on a remote control in response to pressing of a screen switching button (Japanese Unexamined Patent Application Publication No. 2004-96361). Additionally, a technique is provided that switches between a TV screen and a PC screen using a software key of a PC operation screen displayed on a remote control (Japanese Unexamined Patent Application Publication No. 2004-40656).

SUMMARY

According to an aspect of the invention, an information processing apparatus includes: a video signal output unit having a plurality of input paths, the video signal output unit selecting an input path of a video signal to be displayed on a screen from the plurality of input paths and outputting different video signals to a first display unit and a second display unit, a screen switching input unit to input an instruction for switching between a screen displayed on the first display unit and a screen displayed on the second display unit, a determining unit to determine whether an input source of the input path selected for the first display unit is the video signal output unit, and an input control unit turning on the first display unit when the first display unit is turned off at the time of reception of the switching instruction, the input control unit switching the input source to the video signal output unit when the determining unit determines that the input source is not the video signal output unit.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of an information processing apparatus, a method for controlling the information processing apparatus, and a recording medium storing a program for controlling the information processing apparatus disclosed in this application will be described in detail below based on the accompanying drawings. However, it should be noted that the information processing apparatus, the method for controlling the information processing apparatus, and the recording medium storing the program for controlling the information processing apparatus disclosed in this application are not limited by the following embodiments.

Figure 1:
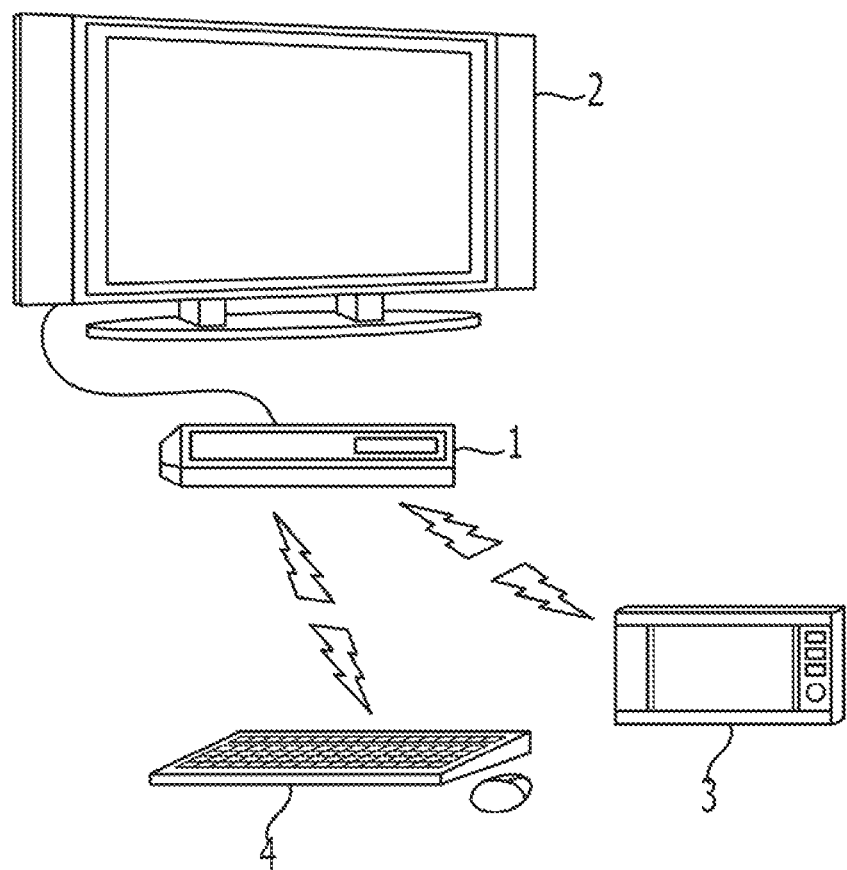
FIG. 1 is a schematic diagram illustrating a configuration of a system including an information processing apparatus.

FIG. 1 is a schematic diagram illustrating a configuration of a system including an information processing apparatus. As illustrated in FIG. 1, the system including the information processing apparatus according to this embodiment includes a main body 1 constituted by a casing including a central processing unit (CPU), a memory, and a hard disk, a television (TV) 2, a wireless device 3, and a wireless keyboard/mouse 4. This main body 1 serves as an example of the information processing apparatus. In this embodiment, a description will be given based on an assumption that a personal computer (PC) serves as the information processing apparatus, for example.

The main body 1 is connected to the TV 2 with a high-definition multimedia interface (HDMI) cable, for example. The main body 1 is also wirelessly connected to the wireless device 3 and the wireless keyboard/mouse 4. The main body 1 wirelessly exchanges data with the wireless device 3 and the wireless keyboard/mouse 4.

Figure 2:
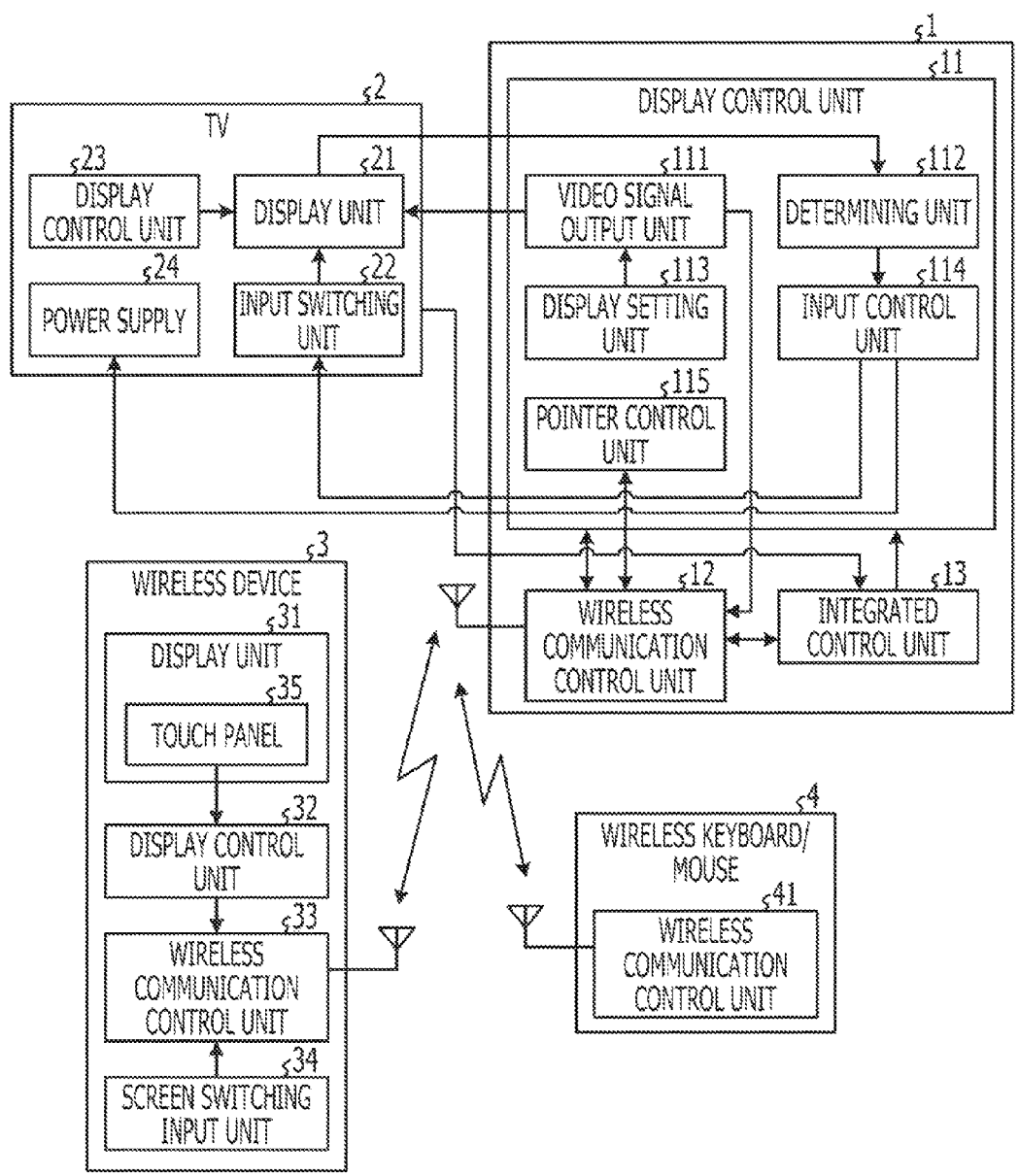
FIG. 2 is a block diagram of a system including an information processing apparatus according to an embodiment.

Details of the system including the information processing apparatus according to the embodiment will now be described with reference to FIG. 2. FIG. 2 is a block diagram of the system including the information processing apparatus according to the embodiment.

A description will be first given for the TV 2. As illustrated in FIG. 2, the TV 2 includes a display unit 21, an input switching unit 22, a display control unit 23, and a power supply 24. In this embodiment, the TV 2 includes an HDMI terminal (not illustrated). The TV 2 is connected to the main body 1 via HDMI. Furthermore, in this embodiment, the TV 2 may be controlled based on HDMI-CEC (consumer electronics control). Since the TV 2 may be controlled based on HDMI-CEC, the TV 2 may receive control operations, such as turning on/off the power supply 24 and input switching, from the main body 1. Furthermore, the TV 2 exchanges a HotPlugDetect signal with the main body 1. The HotPlugDetect signal is for determining whether a cable to the TV 2 is connected.

The power supply 24 supplies electric power to each unit of the TV 2 upon being turned on. Additionally, the power supply 24 stops supplying the electric power to the each unit of the TV 2 upon being turned off. Since the display unit 21 is turned on/off by turning on/off the power supply 24 of the TV 2, a description will be given below based on an assumption that turning on/off the power supply 24 of the TV 2 includes turning on/off of the display unit 21.

The display unit 21 includes a display screen, such as a liquid crystal screen. The display unit 21 also includes a plurality of input paths for receiving video signals to be displayed. In this embodiment, one of the input paths is assigned to input from a video signal output unit 111. When the input of the display unit 21 is set to the input from the video signal output unit 111, the display unit 21 may display an image of software activated in the main body 1. The software displayed in the main body 1 may be, for example, document editor software and spreadsheet software. Additionally, in this embodiment, one of the other input paths is assigned to input of a TV video. Here, the TV video indicates a video distributed from a broadcasting station. That is, when the TV video is displayed on the display unit 21, the TV 2 is used to view the TV program. Hereinafter, changing the input path of the display unit 21 may be referred to as changing input of the display unit 21. The display unit 21 serves as an example of a first display unit.

When the power supply 24 is on, the display unit 21 sends an HDMI-CEC routing command to a determining unit 112 of the main body 1. The HDMI-CEC routing command is a signal informing the determining unit 112 of whether an input source of a video signal of video currently displayed on the display unit 21 is the video signal output unit 111 of the main body 1.

An operator specifies a device for inputting a video signal to the display unit 21, e.g., the input source of the video signal, using an input switching button (not illustrated) of the TV 2. Here, the inputting device is, for example, the main body 1 or the display control unit 23 of the TV 2. Upon receiving the specification of the device for inputting the signal to the display unit 21 from the operator, the input switching unit 22 switches the input path of the display unit 21. For example, when the operator specifies a TV video supplied from the display control unit 23, the input switching unit 22 switches the input of the display unit 21 to the input from the display control unit 23. Additionally, when the operator specifies input of an operation screen of a personal computer (PC) supplied from the video signal output unit 111, the input switching unit 22 switches the input of the display unit 21 to the input from the video signal output unit 111 of the main body 1. Additionally, upon receiving, from an input control unit 114 of the main body 1, an instruction for switching the input of the display unit 21 to the input from the video signal output unit 111, the input switching unit 22 switches the input of the display unit 21 to the input from the video signal output unit 111.

The display control unit 23 causes the display unit 21 to display a TV video received from a broadcasting station or the like.

The wireless device 3 will now be described. The wireless device 3 includes a display unit 31, a display control unit 32, a wireless communication control unit 33, and a screen switching input unit 34.

The wireless communication control unit 33 wirelessly communicates with a wireless communication control unit 12 of the main body 1. In this embodiment, the wireless communication control unit 33 performs communication using wireless universal serial bus (USB). Signals are exchanged between each unit of the wireless device 3 and the corresponding unit of the main body 1 actually through the wireless communication control unit 33 in this way. However, for ease of explanation, a description will be given below as if signals were directly exchanged between each unit of the wireless device 3 and the corresponding unit of the main body 1.

The display unit 31 may be a liquid crystal display (LCD). The display unit 31 also includes a touch panel 35. The touch panel 35 detects a touch operation with a finger of a user or a touch pen. An operator may perform an input operation using the touch panel 35. The display unit 31 displays a touch-panel screen for an operation though the touch panel 35 or a PC operation screen other than the touch-panel screen. Hereinafter, the PC operation screen other than the touch-panel screen is simply referred to as a "PC operation screen". When the PC operation screen is displayed on the display unit 31, the operator may move a pointer using the touch panel 35. The display unit 31 serves as an example of a second display unit.

The display control unit 32 receives a video signal from the video signal output unit 111 of the main body 1. The display control unit 32 then performs image conversion, such as positioning of the received data for the display unit 31. The display control unit 32 displays the PC operation screen on the display unit 31. The display control unit 32 also outputs input supplied from the touch panel 35 to a display control unit 11 and an integrated control unit 13 of the main body 1.

The screen switching input unit 34 includes a button for inputting a screen switching instruction. The operator presses the button of the screen switching input unit 34, whereby the screen switching instruction is sent to the display control unit 11 and the integrated control unit 13 of the main body 1.

Figure 3:
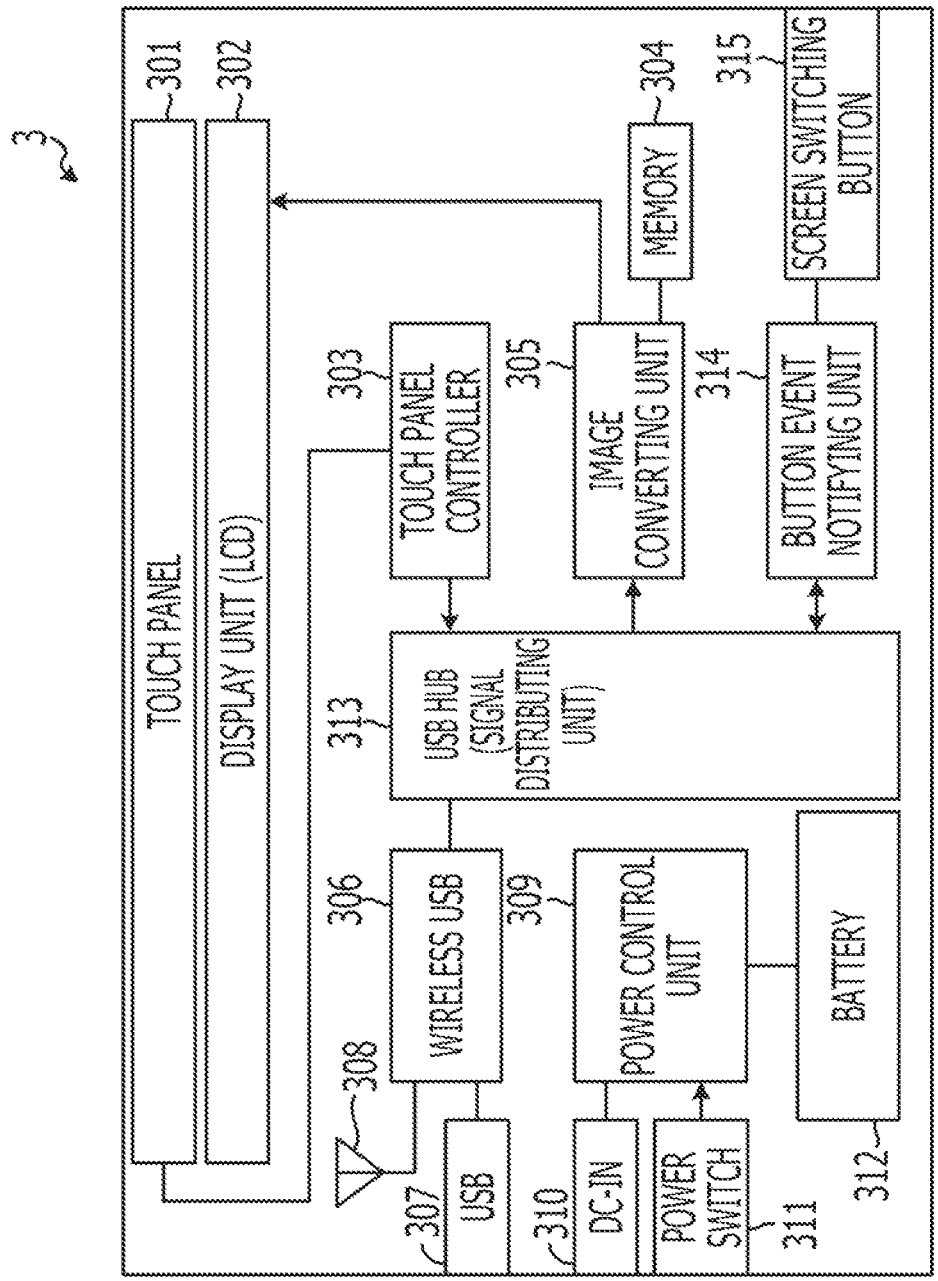
FIG. 3 is a diagram of a hardware configuration of a wireless device according to an embodiment.

A hardware configuration of the wireless device 3 will now be described with reference to FIG. 3. FIG. 3 is a diagram of a hardware configuration of the wireless device 3 according to the embodiment. The wireless device 3 includes a display unit 302, such as a liquid crystal display (LCD). This display unit 302 has a function of the display unit 31 in FIG. 2. The display unit 302 includes a touch panel 301. This touch panel 301 has a function of the touch panel 35 in FIG. 2. The touch panel 301 is connected to a touch panel controller 303. The touch panel controller 303 controls input from the touch panel 301. Additionally, the display unit 302 is connected to an image converting unit 305. The image converting unit 305 further includes a memory 304. The image converting unit 305 converts an image sent from the main body 1 before the converted image is displayed on the display unit 302. At this time, the image converting unit 305 temporarily stores the image in the memory 304 as needed. A combination of the touch panel controller 303, the memory 304, and the image converting unit 305 has a function of the display control unit 32 in FIG. 2. A USB terminal 307 is for connecting the wireless device 3 to the main body 1 with a USB cable. A wireless USB 306 wirelessly communicates with the main body 1 through an antenna 308. This wireless USB 306 has a function of the wireless communication control unit 33 in FIG. 2. A screen switching button 315 is connected to a button event notifying unit 314. If the operator presses the screen switching button 315, the button event notifying unit 314 determines that a screen switching instruction is input and then outputs the screen switching instruction to the main body 1. The screen switching button 315 and the button event notifying unit 314 have a function of the screen switching input unit 34 in FIG. 2. A USB hub 313 outputs the input supplied from the touch panel controller 303 to the main body 1. The USB hub 313 also outputs an image signal supplied from the video signal output unit 111 to the image converting unit 305. The USB hub 313 further outputs the screen switching instruction supplied from the button event notifying unit 314 to the main body 1. A battery 312 supplies electric power to each unit of the wireless device 3. A power switch 311 is for turning on/off the wireless device 3. A power control unit 309 controls power supply from the battery 312 in response to power-on/off through the power switch 311. Additionally, a DC-IN 310 is an input terminal for receiving electric power from outside.

Figure 4:
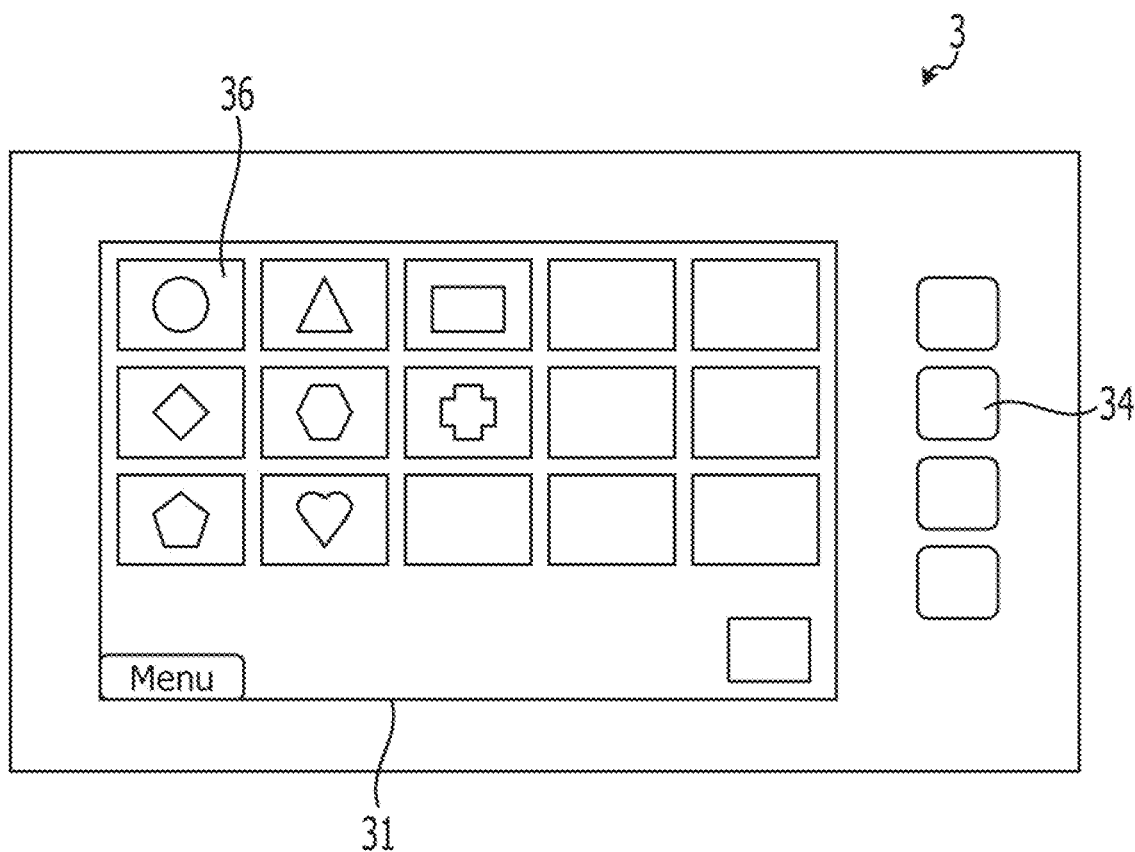
FIG. 4 is a plan view illustrating a state in which a touch-panel screen is displayed on a display unit of a wireless device.

An appearance of the wireless device 3 and an example of the touch-panel screen will now be described with reference to FIG. 4. FIG. 4 is a plan view illustrating a state in which the touch-panel screen is displayed on the display unit 31 of the wireless device 3. In this embodiment, an application launcher for managing activation of an application is used as the touch-panel screen.

The display unit 31 includes the touch panel 35 (not illustrated in FIG. 4). Referring to FIG. 4, the touch-panel screen is displayed on the display unit 31. The display unit 31 displays the application launcher. A FIG. 36 that is arranged on the application launcher displayed on the display unit 31 and is enclosed by a small rectangle indicates an application activation button. The operator physically presses the FIG. 36 with their hand, thereby inputting an application activation instruction for the FIG. 36, for example. Furthermore, as illustrated in FIG. 4, the screen switching input unit 34 is provided separately from the display unit 31.

The wireless keyboard/mouse 4 will now be described. The wireless keyboard/mouse 4 includes a wireless communication control unit 41 as well as a keyboard and a mouse.

The wireless communication control unit 41 wirelessly communicates with the wireless communication control unit 12 of the main body 1. In this embodiment, the wireless communication control unit 41 performs communication using a wireless USB.

The wireless keyboard/mouse 4 outputs information input through the keyboard or the mouse to the display control unit 11 or the integrated control unit 13 of the main body 1 through the wireless communication control unit 41.

The main body 1 of the PC will now be described. As illustrated in FIG. 2, the main body 1 includes the display control unit 11, the wireless communication control unit 12, and the integrated control unit 13.

The wireless communication control unit 12 wirelessly transmits and receives data to and from the wireless device 3 and the wireless keyboard/mouse 4. More specifically, the wireless communication control unit 12 receives a wireless signal from the wireless device 3 and the wireless keyboard/mouse 4 and then outputs the wireless signal to the display control unit 11 and the integrated control unit 13. The wireless communication control unit 12 also wirelessly outputs a signal supplied from the display control unit 11 and the integrated control unit 13 to the wireless device 3 or the wireless keyboard/mouse 4. Although signals are actually exchanged between each unit of the main body 1 and the corresponding unit of the wireless device 3 and the wireless keyboard/mouse 4 through the wireless communication control unit 12 in this way, a description will be given as if signals were directly exchanged between each unit of the main body 1 and the corresponding unit of the wireless device 3 and the wireless keyboard/mouse 4, for ease of explanation.

The display control unit 11 includes the video signal output unit 111, the determining unit 112, a display setting unit 113, the input control unit 114, and a pointer control unit 115. The display control unit 11 also prestores a format of the touch-panel screen.

The determining unit 112 receives, from the integrated control unit 13 to be described later, information regarding whether the TV 2 is connected via HDMI and information whether HDMI-CEC setting is enabled. When the HDMI-CEC setting is enabled in the TV 2, the determining unit 112 determines whether the power supply 24 of the TV 2 is turned on and the input of the display unit 21 is set to the input from the video signal output unit 111 upon receiving the screen switching instruction from the wireless device 3. The determining unit 112 may determine that the power supply 24 is turned off if there is no signal for informing the determining unit 112 of an input source of a video signal sent from the display unit 21. If the power supply 24 of the TV 2 is off, the determining unit 112 informs the input control unit 114 of this information. If the input of the display unit 21 is not set to the input from the video signal output unit 111, the determining unit 112 informs the input control unit 114 of the information.

Upon being informed by the determining unit 112 that the power supply 24 of the TV 2 is off, the input control unit 114 turns on the power supply 24. Additionally, upon informed by the determining unit 112 that the input of the display unit 21 is not set to the input from the main body 1, the input control unit 114 changes the input of the display unit 21 to the input from the video signal output unit 111. The input control unit 114 performs these control operations via HDMI. In this way, the input control unit 114 may construct a multi-display environment allowing the main body 1 to utilize a plurality of screens in response to input of the screen switching instruction.

The display setting unit 113 receives, from the integrated control unit 13 to be described later, information regarding whether the TV 2 is connected via HDMI and information regarding whether HDMI-CEC setting is enabled. If the HDMI-CEC setting is enabled, the display setting unit 113 sets the display unit 21 of the TV 2 as a primary display at the time of booting of a PC. The display setting unit 113 also sets the display unit 31 of the wireless device 3 as a secondary display. Here, the primary display is a main display for use in operations of the PC and is an example of a main screen, whereas the secondary display is a sub auxiliary display for use in operations of the PC and is an example of a sub screen.

Upon receiving the screen switching instruction from the screen switching input unit 34 of the wireless device 3, the display setting unit 113 switches between the primary display and the secondary display set at the time of reception of the instruction if the HDMI-CEC setting is enabled in the TV 2. For example, upon receiving the screen switching instruction in a state where the display unit 21 is the primary display and the display unit 31 is the secondary display, the display setting unit 113 sets the display unit 21 as the secondary display and sets the display unit 31 as the primary display. The display setting unit 113 then outputs setting information of the display unit 21 and the display unit 31 to the video signal output unit 111.

In contrast, if the screen switching instruction for changing the display unit 31 to the secondary display with the HDMI-CEC setting being disabled in the TV 2, the display control unit 11 displays, on the display unit 31, information saying that switching is not permitted. Additionally, if the screen switching instruction for changing the display unit 31 to the primary display is input with the HDMI-CEC setting being disabled in the TV 2, the display setting unit 113 changes the display unit 31 to the primary display. Conversely, if the screen switching instruction for changing the display unit 31 to the secondary display with the HDMI-CEC setting being disabled in the TV 2, the display control unit 11 displays, on the display unit 31, information saying that switching is not permitted.

The video signal output unit 111 receives, from the display setting unit 113, information indicating which one of the display unit 21 and the display unit 31 is the primary display and which one of the display unit 21 and the display unit 31 is the secondary display. The video signal output unit 111 outputs a main PC operation screen to the primary display. Additionally, when the display unit 21 is set to the secondary display, the video signal output unit 111 displays a sub PC operation screen on the display unit 31. This sub operation screen includes a sub operation screen operating in cooperation with a main operation screen and a touch-panel screen independent from the main operation screen. When the display unit 31 is switched to the primary display, the video signal output unit 111 stores a kind of the screen having been displayed on the display unit 31 before switching. When the display unit 31 is switched from the primary display to the secondary display, the video signal output unit 111 outputs, to the display unit 31, a video signal of the screen of the kind having been displayed when the display unit 31 is set as the secondary display the last time. For example, if the touch-panel screen is displayed when the display unit 31 is set as the secondary display the last time, the video signal output unit 111 outputs a video signal of the touch-panel screen to the display unit 31 set as the secondary display resulting from screen switching.

In response to input from the wireless keyboard/mouse 4, the pointer control unit 115 controls a position of a pointer displayed on the screen of the display unit 21 of the TV 2, such as moving the pointer. Additionally, when the PC operation screen is displayed on the display unit 31 of the wireless device 3, the pointer control unit 115 controls a position of a pointer displayed on the screen of the display unit 31 in response to the input from the wireless device 3 or the wireless keyboard/mouse 4. In contrast, when the touch-panel screen is displayed on the display unit 31, the pointer control unit 115 controls the pointer so that the pointer does not move on the screen of the display unit 31. Furthermore, when the screen displayed on the display unit 31 is changed from the PC operation screen to the touch-panel screen, the pointer control unit 115 moves the pointer having been displayed on the display unit 31 to the screen of the display unit 21.

Transition of a screen from each state resulting from screen switching will now be described with reference to FIG. 5.

Figure 5:
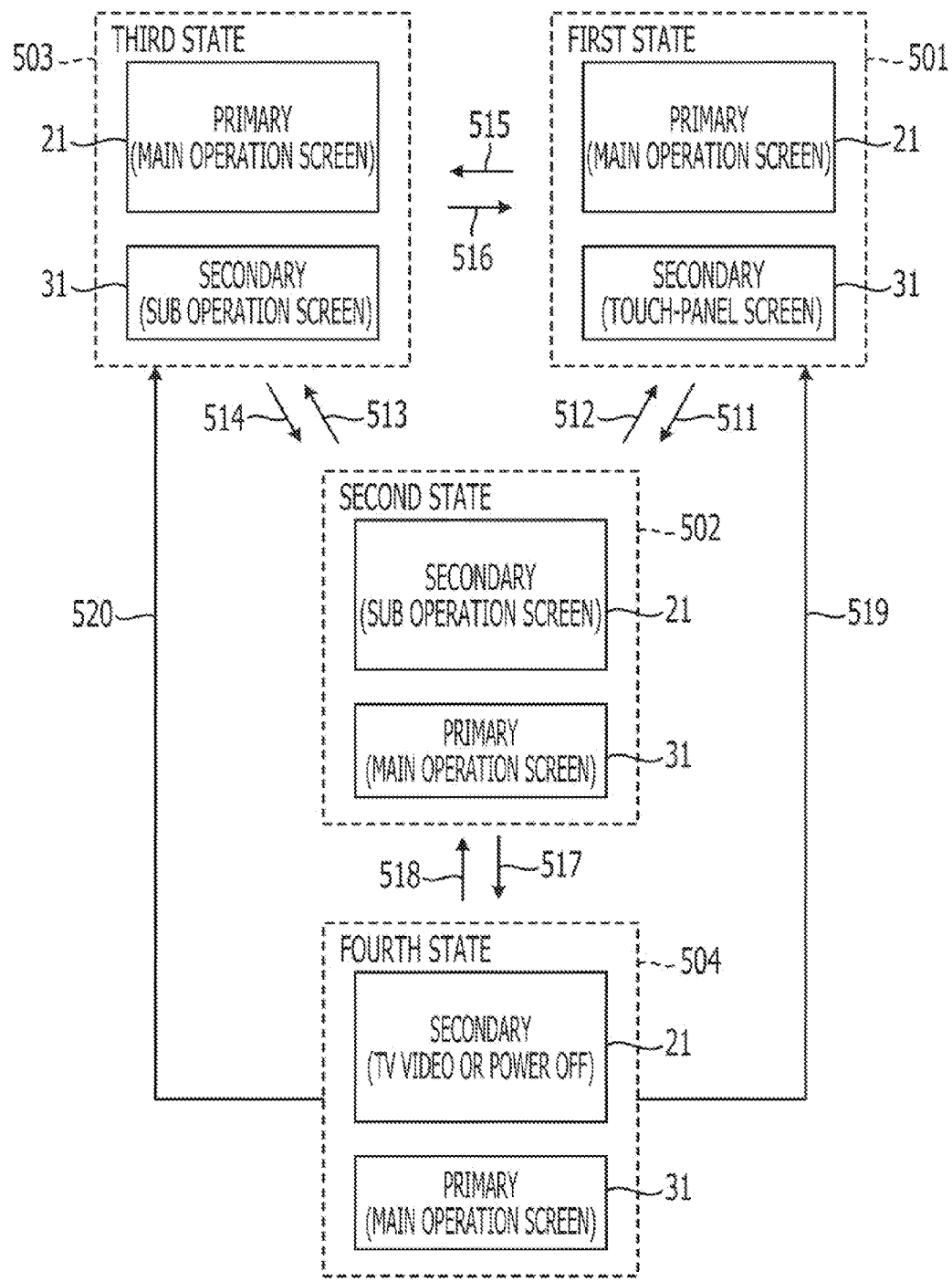
FIG. 5 is a diagram for describing transition of a screen resulting from screen switching.

FIG. 5 is a diagram for describing transition of the screen resulting from screen switching. Each state of the display screen will be described first.

In a first state 501, the display setting unit 113 sets the display unit 21 and the display unit 31 as the primary display and the secondary display, respectively. The video signal output unit 111 outputs a main PC operation screen to the display unit 21. The video signal output unit 111 also outputs, to the display unit 31, a touch-panel screen for operating the PC with the touch panel. That is, the display control unit 11 displays the PC operation screen on the display unit 21 and also displays the touch-panel screen on the display unit 31. In the first state 501, the display control unit 11 causes the display unit 21 and the display unit 31 to display screens independently from one another.

In a second state 502, the display setting unit 113 sets the display unit 21 and the display unit 31 as the secondary display and the primary display, respectively. The video signal output unit 111 outputs a sub PC operation screen to the display unit 21 and a main PC operation screen to the display unit 31. That is, the display control unit 11 causes the display unit 21 and the display unit 31 to display a PC operation screen. In the second state 502, the display control unit 11 causes the display unit 21 and the display unit 31 to display a screen that operates in cooperation with each other. That is, one screen is displayed with both of the display unit 21 and the display 31. For example, a mouse pointer may be seamlessly moved from the display unit 21 to the display unit 31.

In a third state 503, the display setting unit 113 sets the display unit 21 and the display unit 31 as the primary display and the secondary display, respectively. The video signal output unit 111 outputs the main PC operation screen to the display unit 21 and the sub PC operation screen to the display unit 31. That is, the display control unit 11 causes the display unit 21 and the display unit 31 to display the PC operation screen. In the third state 503, just like the second state 502, the display control unit 11 causes the display unit 21 and the display unit 31 to display a screen that operates in cooperation with each other. That is, in the second state 502 and the third state 503, the screens displayed on the display unit 21 and the display unit 31 are switched.

In a fourth state 503, the display setting unit 113 sets the display unit 21 and the display unit 31 as the secondary display and the primary display, respectively. The video signal output unit 111 outputs the sub PC operation screen to the display unit 21 and the main PC operation screen to the display unit 31, respectively. However, since a TV video is displayed on the display unit 21 or the TV 2 is turned off, the display control unit 11 does not cause the display unit 21 to display any screen. At this time, the display control unit 23 included in the TV 2 displays the TV video on the display unit 21 as described later. Additionally, the display control unit 11 displays the PC operation screen on the display unit 31.

Transition of a screen from each state to another state will now be described. Here, it is assumed that the power supply 24 of the TV 2 is turned on and the input of the display unit 21 is set to the input from the video signal output unit 111 in the first state 501, the second state 502, and the third state 503. Thus, operations of the determining unit 112 and the input control unit 114 in transition from the fourth state 504 will be described.

A description will be first given for a case where the display control unit 11 receives input of a screen switching instruction in the fourth state 504.

Upon receiving the screen switching instruction, the determining unit 112 determines whether the power supply 24 of the TV 2 is turned on and the input of the display unit 21 is set to the input from the video signal output unit 111. If the power supply 24 of the TV 2 is turned off or if the input of the display unit 21 is not set to the input from the video signal output unit 111, the determining unit 112 notifies the input control unit 114 of that information. Upon receiving the notification from the determining unit 112, the input control unit 114 changes the state in which the power supply 24 of the TV 2 is turned on and the input of the display unit 21 is set to the input from the main body 1. In this way, the determining unit 112 and the input control unit 114 construct a multi-display environment. Processing for constructing this multi-display environment will be described in detail later.

After the multi-display environment is constructed, the display setting unit 113 sets the display unit 21 and the display unit 31 as the primary display and the secondary display, respectively.

The video signal output unit 111 then confirms whether the stored screen having been displayed on the display unit 21 before the last screen switching is a touch-panel screen or a sub PC operation screen.

If the screen having been displayed on the display unit 21 before the last screen switching is the touch-panel screen, the display control unit 11 moves an application having been displayed on the display unit 31 to the display unit 21. The video signal output unit 111 outputs, to the display unit 31, the main PC operation screen having been output to the display unit 21. Furthermore, the video signal output unit 111 outputs, to the display unit 31, a touch-panel screen using a format of the touch-panel screen stored by the display control unit 11. In this case, the pointer control unit 115 controls the pointer in the second state 502 so that the pointer may move on the screen of the display unit 31. In response to input of the screen switching instruction, the pointer control unit 115 controls the pointer so that the pointer does not move on the screen of the display unit 31. In this way, the display control unit 11 executes transition 519 of the screen from the fourth state 504 to the first state 501.

In contrast, if the screen having been displayed on the display unit 21 before the last screen switching is the sub PC operation screen, the video signal output unit 111 outputs, to the display unit 31, the main PC operation screen having been output to the display unit 21. Furthermore, the video signal output unit 111 outputs, to the display unit 21, the sub PC operation screen having been output to the display unit 31. In this way, the display control unit 11 executes transition 520 of the screen from the fourth state 504 to the third state 503.

Transition from the first state 501 will now be described. Upon receiving the screen switching instruction in the first state 501, the display setting unit 113 sets the display unit 31 and the display unit 21 as the primary display and the secondary display, respectively. The video signal output unit 111 outputs, to the display unit 31, the main PC operation screen having been output to the display unit 21. Furthermore, the video signal output unit 111 outputs, to the display unit 21, the sub PC operation screen. The video signal output unit 111 stores information indicating that the touch-panel screen is output to the display unit 31 before the screen switching. In this case, the pointer control unit 115 controls the pointer in the first state 501 so that the pointer does not move on the screen of the display unit 31. In response to input of the screen switching instruction, the pointer control unit 115 controls the pointer so that the pointer moves on the screen of the display unit 31. In this way, the display control unit 11 executes transition 511 of the screen from the first state 501 to the second state 502.

Transition from the third state 503 will now be described. Upon receiving the screen switching instruction in the third state 503, the display setting unit 113 sets the display unit 31 and the display unit 21 as the primary display and the secondary display, respectively. The video signal output unit 111 outputs, to the display unit 31, the main PC operation screen having been output to the display unit 21. Furthermore, the video signal output unit 111 outputs, to the display unit 21, the sub PC operation screen having been output to the display unit 31. The video signal output unit 111 stores information indicating that the sub PC operation screen is output to the display unit 31 before the screen switching. In this way, the display control unit 11 executes transition 514 of the screen from the third state 503 to the second state 502.

Additionally, transition from the second state 502 to the first state 501 or the third state 503 is similar to an operation performed after construction of the multi-display environment in transition from the fourth state 504. The display control unit 11 performs processing similar to the operation performed after construction of the multi-display environment in the transition from the fourth state 504, thereby executing transition 512 from the second state 502 to the first state 501 or transition 513 from the second state 502 to the third state 503.

A description will now be given for a case where the display control unit 11 receives, from the wireless device 3 or the wireless keyboard/mouse 4, input of an instruction for changing the screen displayed on the display unit 31 to the PC operation screen in the first state 501. In this case, the video signal output unit 111 outputs, to the display unit 31, the sub PC operation screen operating in cooperation with the main PC operation screen output to the display unit 21. In this case, the pointer control unit 115 controls the pointer in the first state 501 so that the pointer does not move on the screen of the display unit 31. In response to input of the instruction for changing the screen of the display unit 31 to the PC operation screen, the pointer control unit 115 controls the pointer so that the pointer moves on the screen of the display unit 31. In this way, the display control unit 11 executes transition 515 of the screen from the first state 501 to the third state 503.

Conversely, a description will now be given for a case where the display control unit 11 receives, from the wireless device 3 or the wireless keyboard/mouse 4, input of an instruction for changing the screen of the display unit 31 to the touch-panel screen in the third state 503. The display control unit 11 first moves an application having been displayed on the display unit 31 to the display unit 21. The video signal output unit 111 then outputs the touch-panel screen to the display unit 31. In this case, the pointer control unit 115 controls the pointer in the third state 503 so that the pointer may move on the screen of the display unit 31. In response to input of the screen switching instruction, the pointer control unit 115 controls the pointer so that the pointer does not move on the screen of the display unit 31. In this way, the display control unit 11 executes transition 516 of the screen from the third state 503 to the first state 501.

A description will now be given for a case where an operator operates the TV 2 to switch the screen displayed on the display unit 21 to a TV video or to turn off the power supply 24. After the operator operates the TV 2 to switch the screen displayed on the display unit 21 to the TV video, the video signal output unit 111 keeps outputting the sub PC operation screen to the display unit 21. However, since the input of the display unit 21 is set to the TV video, the output from the video signal output unit 111 is not displayed on the display unit 21. Additionally, after the operator turns off the power supply 24, the video signal output unit 111 keeps outputting the sub PC operation screen to the display unit 21. However, since the power supply 24 is turned off, the output from the video signal output unit 111 is not displayed on the display unit 21. In this way, transition 517 from the second state 502 to the fourth state 504 is performed in response to the operation of the TV 2 independently from the display control unit 11. In this embodiment, the video signal output unit 111 outputs the sub PC operation screen to the display unit 21 to maintain an operation state of the PC even after the screen of the display unit 21 is switched to the TV video or the power supply 24 of the TV 2 is turned off. However, the video signal output unit 111 may stop sending the sub PC operation screen to the display unit 21 to avoid a circumstance in which the sub PC operation screen is hidden by the TV video. In this case, the display control unit 11 preferably moves an application having been displayed on the display unit 21 to the display unit 31.

A description will now be given for a case where an operator operates the TV 2 in the fourth state 504 to switch the screen displayed on the display unit 21 to the PC operation screen. More specifically, switching the screen displayed on the display unit 21 to the PC operation screen indicates that changing the input of the TV 2 to the input of the video signal output unit 111 from that of the display control unit 23. In this embodiment, the video signal output unit 111 keeps outputting the sub PC operation screen to the display unit 21 in the fourth state 504. Accordingly, if the input of the display unit 21 is changed to the input from the video signal output unit 111, the sub PC operation screen is displayed on the display unit 21. In this way, transition 518 from the fourth state 504 to the second state 502 is performed in response to the operation of the TV 2 by the operator independently from the display control unit 11.

The integrated control unit 13 performs various kinds of processing executed in the main body 1, such as execution of a program. For example, the integrated control unit 13 executes processing in response to input from the wireless device 3 or the wireless keyboard/mouse 4. When displaying of a screen on the display unit 21 or the display unit 31 is needed during various kinds of processing, the integrated control unit 13 causes the display unit 21 or the display unit 31 to display the screen through the display control unit 11.

The integrated control unit 13 also determines whether a HotPlugDetect signal may be exchanged with the TV 2, e.g., whether the HotPlugDetect signal indicates "Connect". If the HotPlugDetect signal does not indicate "Connect", the integrated control unit 13 sends, to the display control unit 11, information indicating that connection to the TV 2 is disconnected. The integrated control unit 13 also determines whether the TV 2 is connected via HDMI. If the TV 2 is connected via HDMI, the integrated control unit 13 determines whether HDMI-CEC setting is enabled in the TV 2. The integrated control unit 13 then sends, to the screen control unit 11, information regarding the HDMI-CEC setting of the TV 2.

Although it is described in this embodiment that the display control unit 11 includes the determining unit 112 that monitors the HDMI-CEC routing command and that determines ON/OFF of the power supply 24 and the input source of the display unit 21, the integrated control unit 13 may include the determining unit 112.

Figure 6:
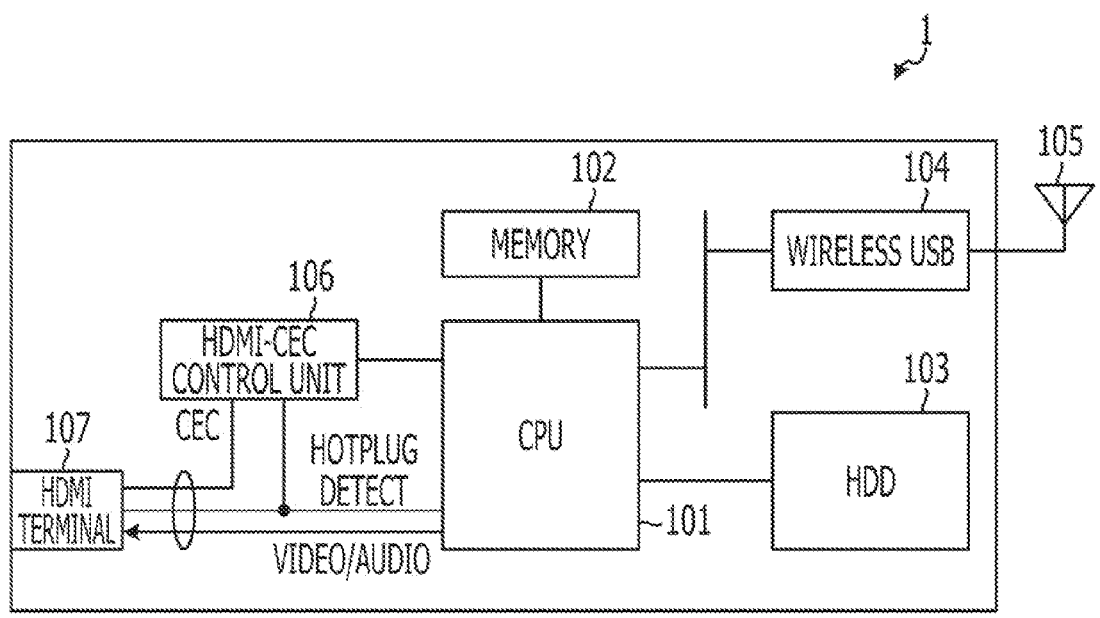
FIG. 6 is a diagram of a hardware configuration of a main body according to an embodiment.

A hardware configuration of the main body 1 will now be described with reference to FIG. 6. FIG. 6 is a diagram of a hardware configuration of the main body 1 according to the embodiment. As illustrated in FIG. 6, the main body 1 according to the embodiment includes a CPU 101, a memory 102, a hard disk drive (HDD) 103, a wireless USB 104, an antenna 105, an HDMI-CEC control unit 106, and an HDMI terminal 107. The memory 102 and the HDD 103 serve as a storage unit. The CPU 101 performs various kinds of processing, such as execution of a program, using the memory 102 and the HDD 103. The CPU 101 also transmits and receives data to and from the wireless device 3 and the wireless keyboard/mouse 4 through the wireless USB 104 and the antenna 105. Here, a combination of the CPU 101, the memory 102, and the HDD 103 has functions of the display control unit 11 and the integrated control unit 13 in FIG. 2. Additionally, the wireless USB 104 has a function of the wireless communication control unit 12 in FIG. 2. The HDMI terminal 107 is a connection terminal to HDMI devices. In this embodiment, the TV 2 is connected to the main body 1 through this HDMI terminal 107. The CPU 101 transmits information, such as video and audio, to the TV 2 through the HDMI terminal 107.

The HDMI-CEC control unit 106 converts an instruction for controlling the TV 2 output by the CPU 101 into an instruction based on the CEC standard and outputs the converted instruction to the TV 2 through the HDMI terminal 107. The HDMI-CEC control unit 106 also converts a control signal from the TV 2 and outputs the converted control signal to the CPU 101.

Figure 7:
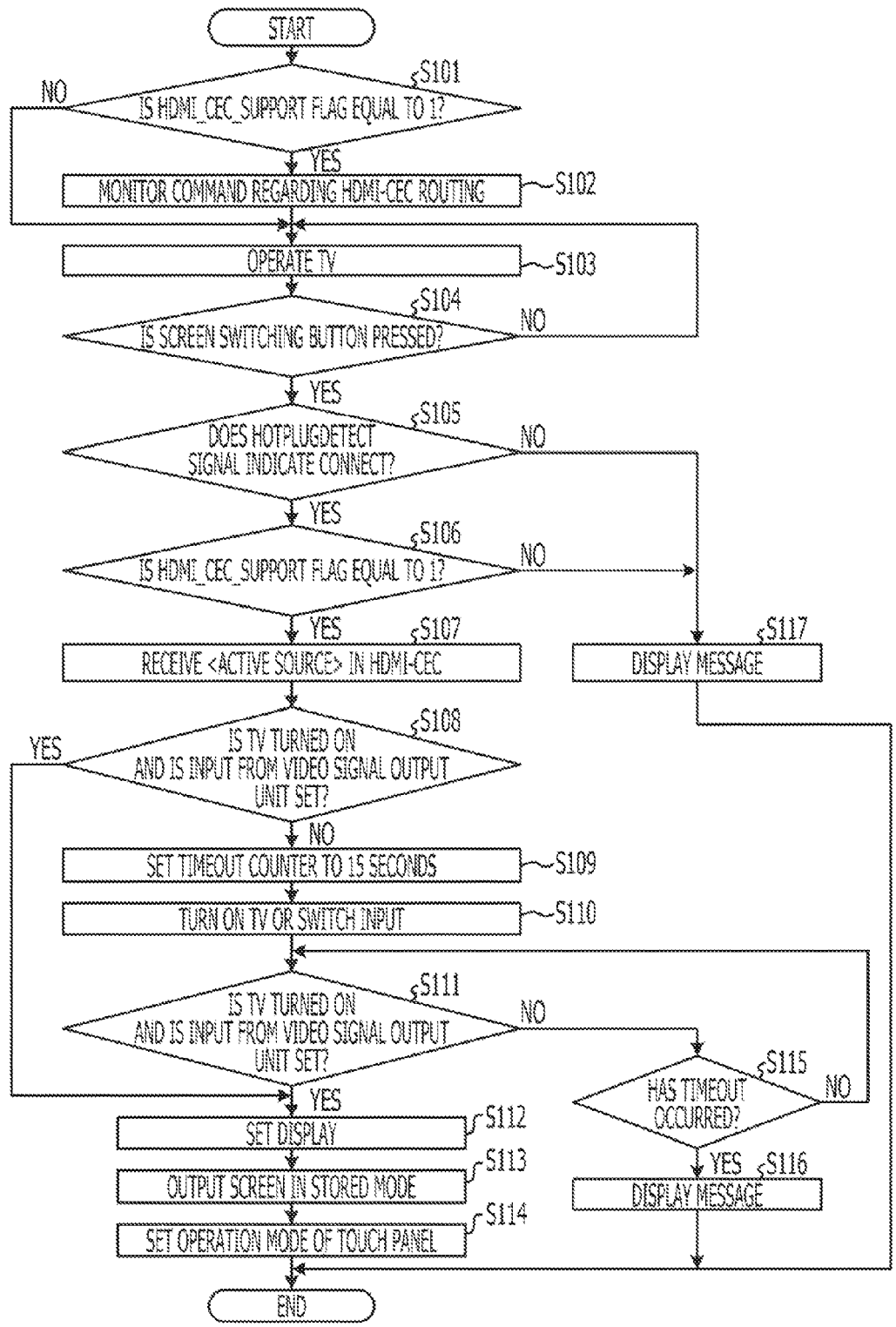
FIG. 7 is a flowchart of screen switching processing from a second or fourth state to a first or third state in an information processing apparatus according to an embodiment.

Screen switching processing from the second or fourth state to the first or third state in the information processing apparatus according to the embodiment will now be described with reference to FIG. 7. FIG. 7 is a flowchart of the screen switching processing from the second or fourth state to the first or third state in the information processing apparatus according to the embodiment. Here, a description will be given based on an assumption that the processing illustrated in FIG. 7 starts once the states of the display unit 21 and the display unit 31 shift into the second or fourth state from the first or third state, for example. Additionally, at the time of booting of the PC, the integrated control unit 13 determines whether the TV 2 is connected via HDMI and whether the HDMI-CEC setting is enabled. If the HDMI-CEC setting is enabled in the TV 2, the integrated control unit 13 sets HDMI_CEC_SUPPORT Flag to 1. Here, the HDMI_CEC_SUPPORT Flag represents presence or absence of the HDMI-CEC setting.

The integrated control unit 31 determines whether the HDMI_CEC_SUPPORT Flag is equal to 1 (OPERATION S101). If the HDMI_CEC_SUPPORT Flag is equal to 1 (YES in OPERATION S101), the determining unit 112 monitors a command regarding an HDMI-CEC routing (OPERATION S102). In contrast, if the HDMI_CEC_SUPPORT Flag is not equal to 1 (NO in OPERATION S101), the determining unit 112 does not monitor the command regarding the HDMI-CEC routing.

An operator then operates the TV 2 (OPERATION S103).

The integrated control unit 13 determines whether a screen switching button is pressed (OPERATION S104). If the screen switching button is not pressed (NO in OPERATION S104), the integrated control unit 13 stands by until the screen switching button is pressed. During that period, OPERATION S103 is repeated.

If the screen switching button is pressed (YES in OPERATION S104), the integrated control unit 13 determines whether the HotPlugDetect signal indicates "Connect" (OPERATION S105).

If the HotPlugDetect signal does not indicate "Connect" (NO in OPERATION S105), the display control unit 11 displays, on the display unit 31, a message saying that switching is not permitted and then terminates the display switching processing (OPERATION S117).

In contrast, if the HotPlugDetect signal indicates "Connect" (YES in OPERATION S105), the determining unit 112 determines whether the HDMI_CEC_SUPPORT Flag is equal to 1 (OPERATION S106). If the HDMI_CEC_SUPPORT Flag is not equal to 1 (NO in OPERATION S106), the display control unit 11 displays a message saying that switching is not permitted on the display unit 31. The display control unit 11 then terminates the screen switching processing (OPERATION S117).

In contrast, if the HDMI_CEC_SUPPORT Flag is equal to 1 (YES in OPERATION S106), the determining unit 112 receives an HDMI-CEC command, i.e., "Active Source", from the TV 2 to acquire information on ON/OFF of the power supply 24 and information on an apparatus that is currently inputting an image signal to the display unit 21 (OPERATION S107).

The determining unit 112 determines whether the power supply 24 of the TV 2 is turned on and the input of the display unit 21 is set to input from the video signal output unit 111 (OPERATION S108). If the power supply 24 is off or the input of the display unit 21 is not set to the input from the video signal output unit 111 (NO in OPERATION S108), the input control unit 114 sets a timeout count value to 15 seconds (OPERATION S109). The input control unit 114 turns on the power supply 24 of the TV 2 if the power supply 24 is off. If the input of the display unit 21 is not set to the input from the video signal output unit 111, the input control unit 114 switches the input of the display unit 21 to the input from the video signal output unit 111 (OPERATION S110).

The input control unit 114 determines whether the power supply 24 of the TV 2 is turned on and the input of the display unit 21 is set to the input from the video signal output unit 111 (OPERATION S111). If the power supply 24 of the TV 2 is off or the input is not set to the input from the video signal output unit 111 (NO in OPERATION S111), the input control unit 114 determines whether timeout has occurred (OPERATION S115). If the timeout has not occurred (NO in OPERATION S115), the display control unit 11 stands by until the power supply 24 of the TV 2 is turned on and the input is set to the input from the video signal output unit 111. In contrast, if the timeout has occurred (YES in OPERATION S115), the display control unit 11 displays a massage saying that control of the TV 2 has failed on the display unit 31 (OPERATION S116) and terminates the screen switching processing.

In contrast, if it is determined that the power supply 24 of the TV 2 is turned on and the input is set to the input from the video signal output unit 111 (YES in OPERATION S108 or YES in OPERATION S111), the display setting unit 113 sets the display unit 21 as the primary display. The display setting unit 113 also sets the display unit 31 as the secondary display (OPERATION S112). The video signal output unit 111 then shifts the states of the display unit 21 and the display unit 31 into the stored mode (OPERATION S113). More specifically, the video signal output unit 111 displays, on the display unit 31, the screen matching the stored one having been displayed on the display unit 31 before switching. The video signal output unit 111 also displays the main PC operation screen on the display unit 21.

The pointer control unit 115 sets an operation mode of the touch panel 35 (OPERATION S114). More specifically, when the touch-panel screen is displayed on the display unit 31, the pointer control unit 115 controls the pointer so that the pointer does not move on the display unit 31. At this time, the display control unit 11 moves an application and the pointer having been displayed on the display unit 31 to the display unit 21. In contrast, when the PC operation screen is displayed on the display unit 31, the pointer control unit 115 controls the pointer so that the pointer may move on the display unit 31.

As described above, the information processing apparatus according to the embodiment may automatically construct a multi-display environment in response to pressing of the screen switching button even when the TV is turned off or input of a video signal is not from the information processing apparatus itself. Accordingly, the information processing apparatus may reduce the difficulty of manually constructing the multi-display environment and, thus, may improve the operability.

Although the above description has been given for the example of the TV, the information processing apparatus may be applied to display devices other than the TV as long as the display devices have an HDMI terminal. Furthermore, although the above description has been given based on an assumption that the TV has the HDMI terminal, the information processing apparatus may operate for display devices capable of grasping an input source of a video signal, e.g., display devices having a specification equivalent to HDMI. In such a case, the information processing apparatus may automatically construct the multi-display environment and, thus, may improve the operability.

Furthermore, although the description has been given for the configuration of displaying a screen on the display unit 31 through wireless connection in each embodiment, the display unit 31 may be connected to the main body 1 with a cable. In such a case, automatic construction of the multi-display environment may be realized and operability improvement may be advantageously obtained.

Although the embodiments have been described mainly for an information processing apparatus and a method for controlling the information processing apparatus, functions similar to the above-described embodiments may be realized by executing a previously prepared information processing program with a computer. Additionally, the program for controlling the information processing apparatus may be recorded on a memory, a hard disk, and other computer-readable recording media provided in the computer and may be read out and executed from the recording media by the computer.

More specifically, in the embodiments, the program for controlling the information processing apparatus demonstrating the functions for executing the above-described various kinds of processing is stored in the HDD 103 of the main body 1. The CPU 101 reads out and executes the program for controlling the information processing apparatus from the HDD 103. In this way, the program for controlling the information processing apparatus functions as a process for controlling the information processing apparatus that executes the above-described various kinds of processing.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. An information processing apparatus using devices as a multiscreen display, comprising:
a memory; and
a processor coupled to the memory, the processor configured to
select an input path of a video signal to be displayed on a screen from a plurality of input paths output different video signals to a first display that includes information indicating an input source of the video signal for the first display and a second display, input an instruction for switching between a screen displayed on the first display and a screen displayed on the second display, determine, based on the information, whether the input source of the input path selected for the first display is the video signal output for the first display, and turn on the first display when the first display is turned off at the time of reception of the switching instruction.

2. The information processing apparatus according to claim 1, wherein the processor is further configured to switch between the video signal output to the first display and the video signal output to the second display when it is determined that the first display is turned on and the input source of the video signal is the video signal output for the first display.

3. The information processing apparatus according to claim 1, wherein the processor is further configured to output a main operation screen of the information processing apparatus to one of the first display and the second display, the processor outputting the main operation screen to the second display when the input source of the video signal of the first display is not the video signal output for the first display or the first display is turned off when the switching instruction is not input.

4. The information processing apparatus according to claim 1, wherein the first display supports a function of consumer electronics control (CEC) defined in high definition multimedia interface (HDMI).

5. The information processing apparatus according to claim 1, wherein the second display is wirelessly connected to the information processing apparatus.

6. The information processing apparatus according to claim 1, wherein the processor is further configured to:
set one of the first display and the second display as a first screen and setting the other one of the first display and the second display as a second screen, and
output the main operation screen of the information processing apparatus to the first screen and output a sub operation screen of the information processing apparatus to the second screen.

7. A control method executed by an information processing apparatus using devices as a multiscreen display, the control method comprising:
outputting different video signals to a first display that includes information indicating an input source of the video signal for the first display and a second display, one input path of a video signal to be displayed being selected for each of the first display and the second display from a plurality of input paths of the video signals;
receiving input of an instruction for switching between the video signal displayed on the first display and the video signal displayed on the second display;
turning on the first display when the first display is turned off;
acquiring information on an input source of the video signal displayed on the first display;
determining, based on the information, whether the input source of the video signal displayed on the first display is the information processing apparatus;
switching the input source to the information processing apparatus when it is determined that the input source is not the information processing apparatus; and
switching between the video signal output to the first display and the video signal output to the second display.

8. The control method according to claim 7, wherein the video signal output to the first display and the video signal output to the second display are switched between when it is determined that the first display is turned on and the input source of the video signal is the information processing apparatus at the time of reception of input of the switching instruction.

9. The control method according to claim 7, wherein a main operation screen of the information processing apparatus is output to one of the first display and the second display, the main operation screen being output to the second display when the input source of the video signal of the first display is not the information processing apparatus or the first display is turned off when the switching instruction is not input.

10. The control method according to claim 7, wherein the first display supports a function of consumer electronics control (CEC) defined in high definition multimedia interface (HDMI).

11. The control method according to claim 7, further comprising:
setting one of the first display and the second display as a first screen and setting the other one of the first display and the second display as a second screen, wherein
the main operation screen of the information processing apparatus is output to the first screen and a sub operation screen of the information processing apparatus is output to the second screen.

12. A non-transitory computer-readable recording medium storing a control program executed by an information processing apparatus using devices as a multiscreen display, the control program causing the information processing apparatus to execute a method, the method comprising:
outputting different video signals to a first display that includes information indicating an input source of the video signal for the first display and a second display, one input path of a video signal to be displayed being selected for each of the first display and the second display from a plurality of input paths of the video signals;
receiving input of an instruction for switching between the video signal displayed on the first display and the video signal displayed on the second display;
turning on the first display when the first display is turned off;
acquiring information on an input source of the video signal displayed on the first display;
determining, based on the information, whether the input source of the video signal displayed on the first display is the information processing apparatus;
switching the input source to the information processing apparatus when it is determined that the input source is not the information processing apparatus; and
switching between the video signal output to the first display and the video signal output to the second display.

13. The non-transitory computer-readable recording medium according to claim 12, wherein
the video signal output to the first display and the video signal output to the second display are switched between when it is determined that the first display is turned on and the input source of the video signal is the information processing apparatus at the time of reception of input of the switching instruction.

14. The non-transitory computer-readable recording medium according to claim 12, wherein
a main operation screen of the information processing apparatus is output to one of the first display and the second display, the main operation screen being output to the second display when the input source of the video signal of the first display is not the information processing apparatus or the first display is turned off when the switching instruction is not input.

15. The non-transitory computer-readable recording medium according to claim 12, wherein
the first display supports a function of consumer electronics control (CEC) defined in high definition multimedia interface (HDMI).

16. The non-transitory computer-readable recording medium according to claim 12, the method further comprising:
setting one of the first display and the second display as a first screen and setting the other one of the first display and the second display as a second screen, wherein
the main operation screen of the information processing apparatus is output to the first screen and a sub operation screen of the information processing apparatus is output to the second screen.

* * * * *